Patented July 8, 1941

2,248,159

UNITED STATES PATENT OFFICE 2,248,159

COMPOUND FOR DESTROYING WATER HYACINTHS, AND METHOD

Kenneth J. Boyd, Tallahassee, Fla.

No Drawing. Application October 12, 1940, Serial No. 360,923

2 Claims. (Cl. 167—45)

This invention relates to a chemical composition for destroying the water hyacinths and similar growths. The water hyacinth has very rapid growth in certain lake areas, particularly in the extreme southern areas of the United States, and in many cases the plant so rapidly develops as to entirely prevent normal use of the lake for boating and fishing. Thus, Lake Trafford, near Immokalee, Florida, having a total area of nearly 2,000 acres was, in the summer of 1940, obstructed to an extent of approximately one-fourth of its surface by massed water hyacinth plants, and inasmuch as the said lake is one of the outstanding fishing lakes in southern Florida, the obstruction by said plants to boat movements, and the shutting off from normal use of very large areas has been a serious problem. The objectionable massed growths have also obstructed drainage canals, etc.

The method of attack employed upon the water hyacinth at Lake Trafford and elsewhere, has more recently been through the use of heavy boats in conjunction with mechanical contrivances cutting and mechanically acting upon the plants.

For many years arsenic in combination with other materials has been proposed, and has been used, for the destruction of the water hyacinth and similar plant growths. It has been found that when the form and concentration of the arsenic compounds heretofore proposed is sufficient to have the desired effect, the compound has been deleterious to such an extent as to make its use unsatisfactory. In some cases the proposed compound has been destructive of fish life but repellant to animals. In other cases, as where the ingredients of the compound include materials such as acids or oxidizing agents to enable greater plant penetration by the arsenic, the compound has been definitely harmful to both animal and fish life, etc., etc.

I have discovered and have demonstrated by extended successful tests, that arsenic in a compound of special form may be used in relatively high concentration so as to very quickly and effectively destroy the water hyacinth and similar plant growths without deleterious effect upon fish life or animal life, and without the use of animal repellants such as fuel oil or other repellants which are inherently objectionable.

My compound is as follows:

| | Parts by weight |
|---|---|
| Di-calcium arsenite | 75–95 |
| Calculated as arsenious oxide | 42 –57 |
| Calculated as metallic arsenic | 31.5–43 |
| Calculated as water soluble arsenious oxide | 2 - 6 |
| Calculated as water soluble metallic arsenic | 1.5– 4 |
| Inert ingredients | 5–25 |

These materials are mixed with water in the proportion of one pound to preferably 15 gallons of water, although the proportion of water may be substantially increased in many cases as where it is desired to effect the plant destruction by more than a single treatment.

When prepared, the compound is applied to the plant by a suitable spray device so that leaves and stalks receive the compound. Following the spraying of 5 acres of hyacinths in Lake Trafford, within two days the sprayed hyacinths withered and died and wind and waves dispersed the dead plants.

Careful observation wherever the compound had been used, has revealed no harmful effects on fish life. This finding is emphasized by the fact that in Lake Trafford fish life is very prolific as shown by the sein removal from the lake in June 1940 of great numbers of predatory fish in order to preserve valuable food fish, 58 tons of predatory fish having been removed in said period.

The compound is repellant to animal life, observation showing that cattle will not touch anything which has been sprayed by the mixture, and no evidence of harmful effect on other animal life having been found, which further demonstrates the general repellant effect of the compound.

Having described my invention, what I claim and desire to secure by Letters Patent, is as follows:

1. A water hyacinth and similar plant growth destroying composition, comprising di-calcium arsenite having a content as arsenious oxide 42–57 per cent, as metallic arsenic 31.5–43 per cent, as water soluble arsenious oxide 2–6 per cent, and as water soluble metallic arsenic 1.5–4 per cent, and a water carrier therefor, said percentages being independent of inerts.

2. A method of destroying water hyacinth and similar plant growths, which comprises the admixture of the solid ingredients specified in claim 1 in the proportion of approximately 1 pound thereof and approximately 15 gallons of water, and applying the compound thus prepared in the form of a spray upon water hyacinth and similar plant growths to effect the destruction thereof by a single spraying operation.

KENNETH J. BOYD.